Oct. 6, 1931.  L. P. MOOERS  1,826,185
PISTON
Filed July 5, 1923  3 Sheets-Sheet 3
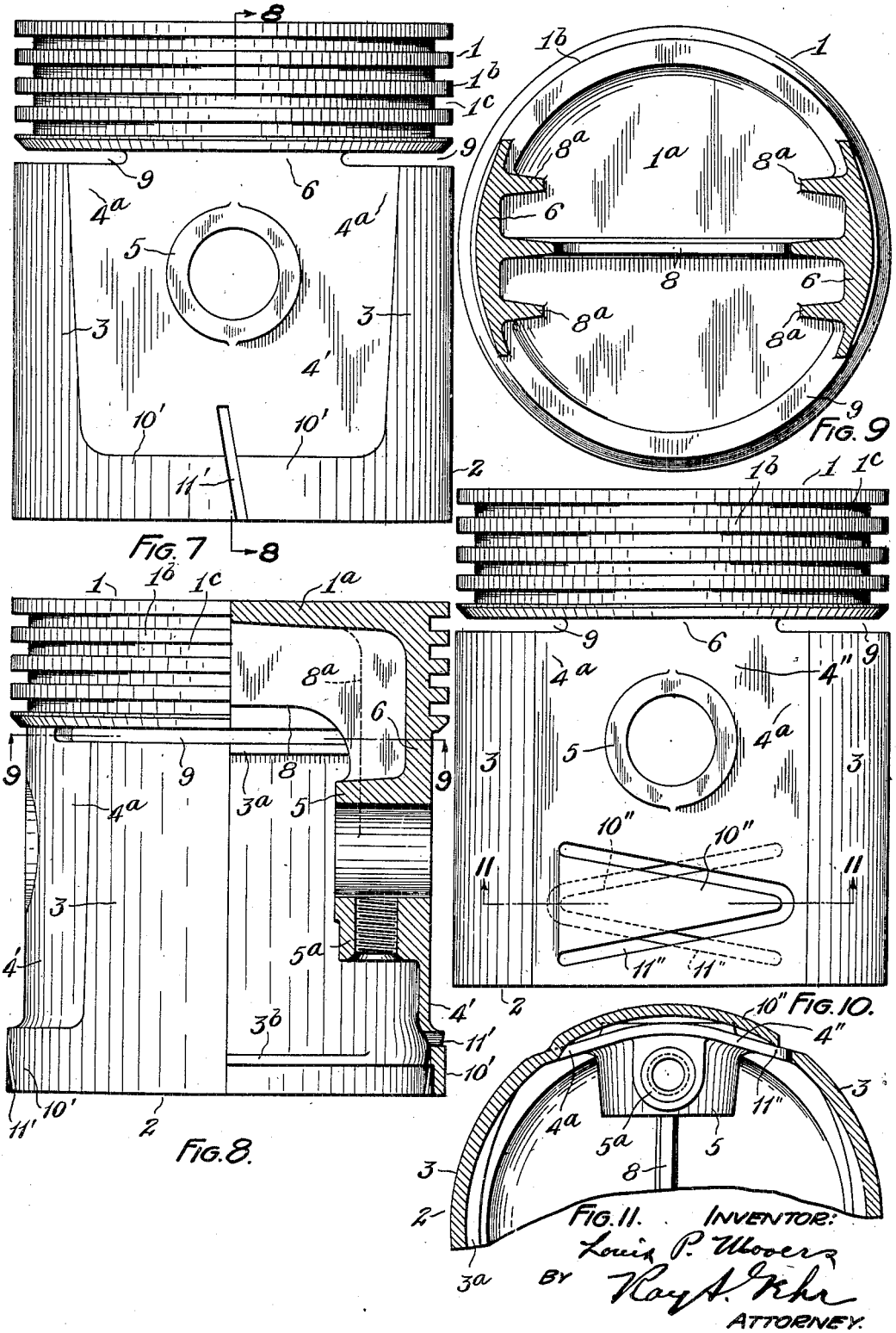

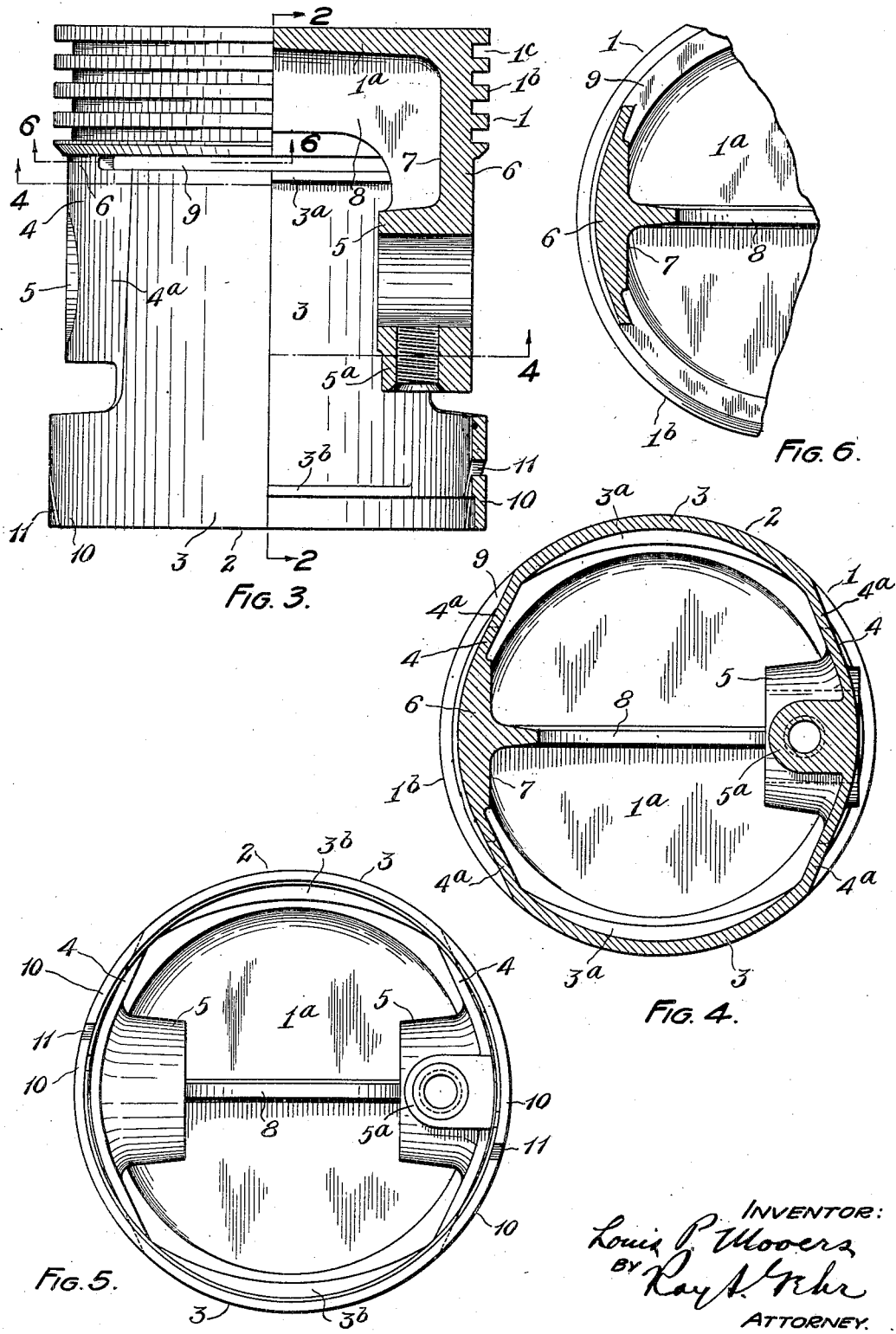

Patented Oct. 6, 1931

1,826,185

UNITED STATES PATENT OFFICE

LOUIS P. MOOERS, OF TONAWANDA, NEW YORK, ASSIGNOR TO THE CLEVELAND TRUST COMPANY, OF CLEVELAND, OHIO, A CORPORATION OF OHIO

PISTON

Application filed July 5, 1923. Serial No. 649,481.

This invention relates to pistons for use in internal combustion engines and more particularly it has to do with improvements on my invention disclosed in Letters Patent of the United States, No. 1,402,309, granted January 3, 1922.

One of the objects of my invention is to provide a piston having guide or skirt portions for taking the angular thrust of the connecting rod that are adapted to maintain their cylindrical form concentric with the engine cylinder and also a uniformly close sliding fit with said cylinder notwithstanding the thrust of the connecting rod and the variable expansion incident to the heat of combustion to which the piston is subjected in the operation of the engine.

Another object of the invention is to accomplish the above end with a piston structure having thin sections and light weight.

A further object of the invention is the provision of a piston of the character shown in Figs. 10 to 14 of the aforesaid Letters Patent No. 1,402,309 in which the forces due to the thermal expansion of the piston head tend to maintain the aforesaid concentric form and uniform clearance of the thrust-sustaining guide sections rather than to distort said sections and cause them to bind in the cylinder.

Another object of the invention is to provide a piston of the character shown in Figs. 10 to 14 of said Letters Patent No. 1,402,309 in which certain of the longitudinal sections of the skirt or guide are afforded greater freedom to expand and contract with the piston head and at the same time the piston is effectively held against lateral displacement or lateral tipping in the cylinder transversely of the plane of the connecting rod thus avoiding both undue friction and oil pumping past the piston rings which would result from such lateral movement of the piston.

Other objects of the invention will appear from the following description of preferred embodiments thereof.

In the drawings:

Fig. 3 is a view of the piston partly in side elevation and partly in section, the section being taken on the line 3—3, Fig. 1.

Fig. 4 is a transverse section on the broken line 4—4, Fig. 3.

Fig. 5 is a bottom view of the piston.

Fig. 6 is a fragmentary section on the line 6—6, Fig. 3.

Fig. 7 is a side elevation of a modified form of piston embodying the invention.

Fig. 8 is a view partly in side elevation and partly in longitudinal section of the piston shown in Fig. 7, the section being taken on the line 8—8, Fig. 7.

Fig. 9 is a section on the line 9—9, Fig. 8.

Fig. 10 is a side elevation of a piston of still another form of construction, embodying my invention.

Fig. 11 is a fragmentary section on the line 11—11, Fig. 10.

Figure 1:
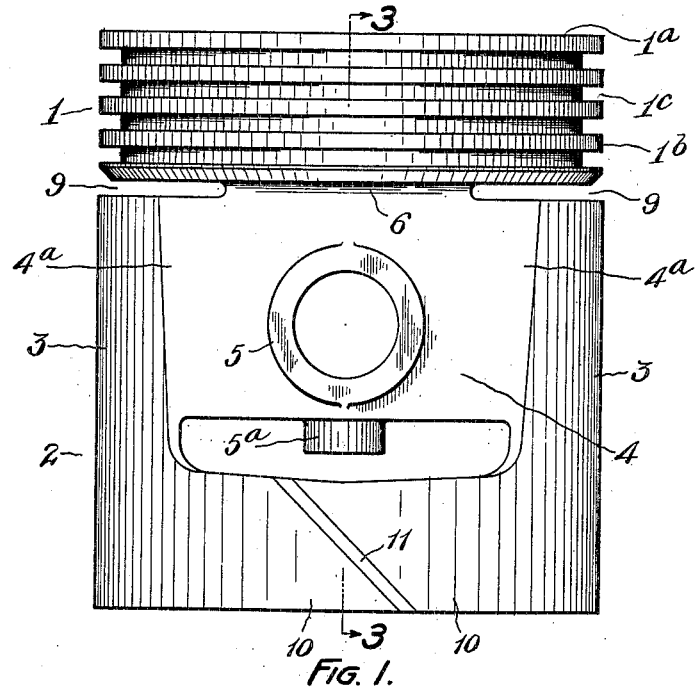
Fig. 1 is a side elevation of a piston embodying my invention.
Figure 2:
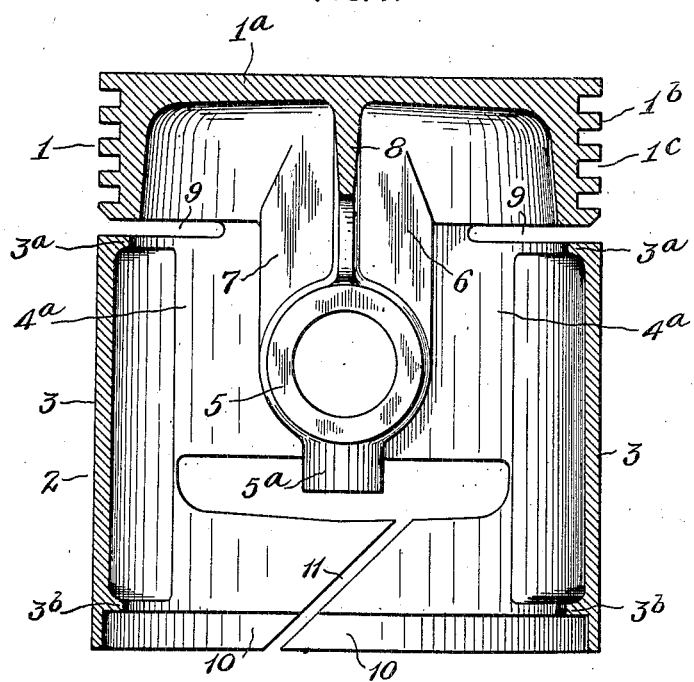
Fig. 2 is a longitudinal central section of the piston shown in Fig. 1, the section being taken on the line 2—2, Fig. 3.

Referring first to the construction shown in Figs. 1 to 6, inclusive, the piston as shown is in the form of an integral casting and is well adapted to be formed of aluminum or other light alloys, although the invention is also applicable to iron and steel pistons. The piston comprises a head section 1 and a guide section 2. The head section has an end wall 1a and a side wall 1b formed with the usual piston ring grooves 1c.

The guide section 2 is formed with diametrically opposite cylinder-engaging portions 3, 3 and intermediate portions 4, 4. Said intermediate portions 4, 4 are formed with wrist pin bosses 5, 5 and one of said bosses is preferably formed with the usual set screw lug 5a. The intermediate portions 4, 4 are exteriorly relieved or inset so that from the upper end of the guide section to points below the wrist pin bosses these intermediate portions 4 have no engagement with the cylinder wall.

The head and guide sections of the piston are rigidly secured together by connections 6, 6 which extend from the head section downward to the upper ends of the intermediate portions of the guide section in the regions of the bosses 5, 5. To insure adequate strength for the connections 6, 6, the side walls of the head section and of the intermediate portions of the guide section are thickened at 7 and in addition a rib 8 is preferably extended across the underside of the head and down its side walls to the tops of the bosses 5, 5. The upper ends of the cylinder-engaging portions 3, 3, and also of the adjacent parts 4a, 4a of the intermediate portions 4, 4, are separated from the head section by air gaps 9, 9. The air gaps 9, 9 are preferably cut after the piston is cast although they can, if desired, be formed when the piston is cast.

As will be noted on reference to Fig. 4, the cylinder-engaging portions 3, 3 are formed with thicker sections than are the intermediate portions 4, 4. In order to further strengthen the portions 3, 3 and render them more rigid, without unduly increasing their weight, they are formed at their upper ends with inwardly turned flanges 3a, 3a which are of maximum width at the centers of the portions 3, 3 and preferably diminish in width towards the sides thereof. I preferably also provide the cylinder-engaging portions 3, 3 with similar circumferential ribs 3b near the lower ends, though in some cases the cylinder-engaging portions 3 may be rendered sufficiently rigid by ribs 3a at their tops only. With the walls of the guide section thus formed, it will be seen that the cylinder-engaging parts 3, 3 are very strong and rigid while the intermediate portions 4 and especially the parts 4a thereof are relatively thin and flexible. It will also be observed that the opposite intermediate portions 4, 4 at one side of the boss axis diverge from the points where they join the sides of the cylinder-engaging portions 3, 3 to the points where they engage the bosses and the pillar-like parts 7.

At points below the wrist pin bosses the guide structure is provided with resilient cylinder-engaging parts adapted by flexing to accommodate the thermal expansion of the piston parts, especially the outward movement of the intermediate portions 4, 4 incident to the expansion of the piston head, and at the same time to yieldingly oppose lateral displacement of the piston or lateral tipping of the lower end thereof transversely of the plane of the connecting rod. In the present form of construction these resilient cylinder-engaging parts are in the form of circumferential extensions 10, 10 of the cylinder-engaging portions 3, 3. In fabricating the piston the lower part of the guide section can be cast with its lower part unbroken circumferentially and then, after machining, the extensions 10, 10 can be separated from each other by cutting openings 11 which are preferably inclined, as shown.

In the use of pistons such as above described, the guide portions 3, 3 and 10, 10 are machined to give the guide section a suitable sliding fit in the cylinder. It has been customary in the case of many aluminum pistons as heretofore constructed to finish the skirts of the pistons with a materially larger clearance than has been given iron pistons of the same size so as to accommodate the greater thermal expansion characteristic of aluminum and its alloys. As is well understood, this has been one of the chief difficulties encountered in the use of aluminum alloy pistons. With my improved construction, however, for reasons which will presently be explained, it is not necessary to finish aluminum alloy pistons with any greater clearance than has been given to iron pistons of similar size; in fact, by means of my improved form of construction it is possible even to reduce the clearance of iron pistons in comparison with prior practice and still secure satisfactory operation under the varying temperature conditions of operation met with in internal combustion engines.

The side wall of the head section of the piston, made up of the lands between the piston ring grooves, is finished to smaller diameter than the guide section of the piston, in accordance with the usual practice.

In the use of the piston above described, when made of aluminum alloy or the like, the guide portion of the piston is machined to give it a working fit in the cylinder at least as close as heretofore has been found feasible in the use of iron pistons operating under similar conditions. In operation the head of the piston, being in direct contact with the hot combustion gases, is the hottest part of the piston structure and the most marked thermal expansion occurs in the head section. Some heat is, of course, transmitted from the head section through the connectors 6 to the guide section and the latter undergoes a corresponding expansion; but this latter expansion is very small in comparison with the expansion of the head section. The expansion of the head is, of course, most marked along radial lines. This radial expansion of the head is not transmitted to the cylinder-engaging portions 3, 3 of the guide because, with the intervening air gaps 9, 9, said portions have no direct connection with the head. The radial expansion of the head is, however, transmitted through the connectors 6 to the intermediate portions 4 of the guide, but as the latter are inset from the cylinder wall, or relieved in relation to the cylindrical surfaces of the guide portions 3, 3 the intermediate portions 4, 4 are free to move with the head when it expands radially without causing engagement between the portions 4 and the cylinder, even though there may be a marked outward movement of the intermediate portions 4, 4 and the bosses 5, 5 carried thereby. As noted above the heat transmitted from the head to the guide portions 4 and 3 results in expansion of these parts but this expansion is relatively slight. Furthermore, while the slight expansion of the cylinder-engaging portions 3, 3 and of the intermediate portions 4 tend to somewhat increase the diameter of the guide, measured across the cylinder-engaging portions 3, 3, and to bring the side edges of said cylinder-engaging portions slightly closer to the cylinder wall, this tendency is counteracted by the preponderant effect on the intermediate portions 4, 4 of the radial expansion of the head transmitted through the connectors 6. On referring to Fig. 4, it will be seen that as the connectors 6, 6 are forced apart by the radial expansion of the piston head, tension is set up in the intermediate portions 4, 4 which, by reason of the diverging relation of the opposite portions 4, 4, exerts forces on the cylinder-engaging portions 3, 3, tending to draw them together. Furthermore, thermal expansion of the piston guide parts is at least partially compensated by the simultaneous expansion of the cylinder. The net result from my improved construction is that the working piston clearance is at least as great after the engine warms up as it is when starting with the engine cold.

The above described action on the guide portions 3, 3 as the piston warms up is accomplished substantially without any distortion of the said portions, first, because the said portions are given a very rigid form of construction and second, because the parts 4a interposed between the said portions 3, 3 and the connectors 6, are relatively thin and flexible, said parts 4a having no direct connection with the cylinder head and being therefore relatively free to flex under the forces set up by the radial expansion of the head. The rigidity of the guide portions 3, 3 is secured without making them unduly heavy by providing them with the circumferential ribs 3a, 3b. By suitably proportioning and forming the various sections of the piston and especially the parts 4a, the thermal expansion of the piston structure can be practically completely neutralized insofar as the cylinder-engaging guide portions of the piston are concerned. That is to say, with the parts properly proportioned the thermal expansion of the piston results in no greater increase in the diameter of the guide section measured across the cylinder-engaging parts 3, 3 than takes place in the diameter of the cylinder, and no distortion of the cylinder-engaging guide surfaces occurs, so that a substantially uniform clearance is attained under both hot and cold conditions of the engine. Indeed, my experience indicates that it is even possible, by means of my improved construction, to render the working piston clearance greater when the engine is hot than when it is cold. My piston thus overcomes one of the major difficulties incident to the ordinary pistons of aluminum and magnesium alloys. Furthermore, by means of my improved construction, I find it possible to fit even iron pistons with smaller clearance than has been possible with prior forms of piston construction.

This notable result is secured without any danger of the piston seizing in the cylinder or scoring the cylinder by localized pressure due to distortion of the cylinder-engaging parts of the piston. By making the cylinder-engaging portions 3, 3 of the guide extremely rigid and maintaining their outer cylindrical surfaces truly concentric with the cylinder walls all troubles of this character are obviated. For this reason and the further reason that the working clearance does not increase as the engine warms up, a uniformly thin film of oil is maintained between the guide portions 3, 3 and the cylinder wall, so that cooling by conduction of heat to the cylinder wall is maintained at maximum efficiency uniformly over the guide portions 3, 3.

While the cylinder-engaging portions 3, 3 of the piston guide sections serve adequately to perform the guiding functions of the piston insofar as the angular thrusts of the connecting rod are concerned, these cylinder-engaging portions are not adapted to adequately restrain the piston from bodily lateral movements and lateral tipping of the lower end of the piston transversely of the plane of the connecting rod; but this function is satisfactorily performed in my improved construction by the resilient and flexible parts 10, 10 which because of their flexibility, perform this function without any danger of causing binding or undue friction of the piston in the cylinder. Nor do these resilient parts 10, 10 interfere with the outward movement of the portions 4, 4 of the guide section, incident to the expansion of the head section. If no means were provided for preventing lateral movement or tipping of the piston this movement would result in oil pumping by the piston rings as well as more or less vibration and slap incident to the tipping of the piston.

In Figs. 7, 8 and 9, I have shown a modified form of construction in which many of the cylinder parts are like the corresponding parts in the first described construction. These parts are designated by the same reference characters and need not be described in detail. In this second form of construction the connectors 6, 6 between the head section and the guide section are additionally strengthened by means of vertical ribs 8a, 8a which extend from the sides of the bosses 5, 5 upward to the cylinder head 1a, these ribs being provided in addition to the rib 8 which extends from the bosses upward to and across the underside of the head as in the first form of construction.

In addition, the second form of construction is provided with intermediate guide portions 4' which, instead of having free lower edges, merge at their lower sides with circumferential extensions 10', 10' of the cylinder-engaging portions 3, 3. In the production of this second form of construction the extensions 10', 10' are preferably cast in one and then separated by cutting the openings 11' as shown in Fig. 7, these openings being carried well up into the intermediate portions 4', 4' so as to secure the desired flexibility of the extensions 10'. In this form of construction the extensions 10' are preferably made with a less vertical width than the extensions 10 of the first form of construction.

In Figs. 10 and 11 is shown still another form of construction for providing resilient means beneath the wrist pin bosses to prevent lateral displacement or tipping of the piston. In this last construction most of the parts are similar to the corresponding parts in the first form of construction and are designated with the same reference characters. This last construction differs from that first described in that the intermediate portions 4″, 4″ of the guide section are carried downward to the lower ends of the guide section and in their lower parts are formed with outstanding resilient circumferentially extending fingers 10″, 10″ which have their outer surfaces finished uniformly with the cylindrical surfaces of the cylinder-engaging parts 3, 3 and serve by their yielding engagement with the cylinder walls to prevent undesirable lateral displacement and tipping of the piston.

The resilient fingers 10″ are preferably formed in the casting of the piston, though they can be in part subsequently formed by cutting the openings 11″ which free the fingers at their sides and one end from the guide portions 4″.

It will be understood that the functioning of the pistons of the last two forms of construction is substantially the same as that of pistons of the first form of construction. Further description of the operation of the second and third forms of construction will therefore be unnecessary. I may note, however, that on the whole I prefer the form of construction first described. In the foregoing description I have referred to the head end of the piston as the upper end and the open end of the piston as the lower end but it will, of course, be understood that the invention is not limited to vertical types of engines and that the terms "upper" and "lower" are used as a matter of convenience. It will be further understood that my invention as defined in the appended claims can be embodied in forms of construction other than those which have been described.

What I claim is:

1. A piston for an internal combustion engine comprising a head section, a guide section having diametrically opposite rigid cylinder-engaging portions with circumferentially extending ribs on their inner sides and separated from the head section by air gaps and intermediate portions formed with opposite wrist pin bosses, means connecting the upper ends of the said intermediate portions to the head section, said intermediate portions being exteriorly relieved so as not to contact with the cylinder wall from their upper ends to points below the wrist pin bosses, and resilient cylinder-engaging means at the lower ends of the intermediate portions adapted by flexing to accommodate the thermal expansion of the piston parts and at the same time to effectively hold the lower end of the piston against lateral movement transversely of the plane of the connecting rod.

2. A piston for an internal combustion engine comprising a head section, a guide section having diametrically opposite rigid cylinder-engaging portions and intermediate portions formed with wrist pin bosses and to have no contact with the cylinder from their upper ends to points below said bosses, and means connecting said intermediate portions in the regions of the bosses with the head, the said cylinder-engaging portions and the parts of the intermediate portions adjacent thereto being separated from the head by air gaps, the said adjacent parts of the intermediate portions being less rigid than the cylinder-engaging portions and said connecting means being adapted when the piston head expands to apply through the intermediate portions stresses to said cylinder-engaging portions in a manner tending to draw them toward each other.

3. A piston for an internal combustion engine comprising a head section, a guide section having diametrically opposite rigid cylinder-engaging portions and intermdiate portions formed with wrist pin bosses and to have no contact with the cylinder from their upper ends to points below said bosses, and means connecting said intermediate portions in the regions of the bosses with the head, the said cylinder-engaging portions and the adjacent parts of the intermediate portions being separated from the head by air gaps, the said adjacent parts of the intermediate portions being thinner and less rigid than the cylinder-engaging portions and said connecting means being adapted when the piston head expands to apply through the intermediate portions stresses to said cylinder-engaging portions in a manner tending to draw them toward each other.

4. A piston for an internal combustion engine cylinder comprising a head section, diametrically opposite boss-carrying portions depending from said head section and formed to have no contact with the engine cylinder, and a guide section having opposite arcuate bearing portions flexibly connected at their side edges with said boss-carrying portions and separated at their upper ends from said head section, said bearing portions being relatively rigid adjacent said head section, and bearing portions extending between said arcuate bearing portions below said boss-carrying portions, thereby providing a substantially continuous bearing surface at the open end of said piston and spaced segmental bearing portions adjacent the head section, said boss-carrying portions through the flexible connections with said arcuate bearing portions being arranged when said head section expands to apply stresses tending to draw the said segmental bearing portions toward each other without substantial distortion.

5. A piston for an internal combustion engine cylinder, comprising a head section, a guide section having a substantially continuous cylinder-engaging portion at the open end of said piston and diametrically opposite segmental cylinder-engaging portions at the open end of said piston and diametrically opposite segmental cylinder-engaging portions adjacent and separated from said head section, spaced rigid means depending from said head section, and transversely flexible means connecting said segmental cylinder-engaging portions to said means depending from said head section, the walls of said segmental cylinder-engaging portions being transversely stiffened, said flexible means being arranged when said head section expands to apply stresses to said segmental portions, tending to draw said segmental portions toward each other without substantial distortion.

6. A piston for an internal combustion engine, comprising a head section, a guide section including opposite bearing portions adjacent to and separated from said head section, rigid spaced portions depending from said head, and flexible means joining the bearing portions with said rigid depending portions and separated from said head section, said flexible means being of lesser transverse rigidity than the walls of said bearing portions and arranged to apply stresses to said bearing portions in a manner tending to draw said bearing portions toward each other without substantial distortion when the head section expands.

7. A piston for an internal combustion engine, comprising a head section, a single piece guide section including a substantially continuous annular bearing portion at the open end of said piston and diametrically opposite segmental bearing portions adjacent to and separated from said head section, and intermediate externally relieved boss-carrying portions depending from said head and having connections with said segmental bearing portions, said connections being less rigid than said segmental bearing portions and being flexible to permit said boss-carrying portions when said head section expands to apply stresses to said segmental bearing portions in a manner tending to draw said segmental portions toward each other without substantial distortion.

8. A piston for an engine cylinder, comprising a head, wrist pin boss-carrying portions depending from the head and arranged to have no contact with the engine cylinder, arcuate cylinder-engaging portions, and flexible means separated from the head and flexibly connecting the cylinder-engaging portions with the wrist pin boss-carrying portions, so that separational movement of the boss-carrying portions during expansion of the piston head tends to draw the cylinder-engaging portions toward each other without substantial distortion, to thereby substantially compensate for thermal expansion of the piston in the cylinder.

9. A piston for an internal combustion engine, comprising a head section, a guide section including a substantially continuous annular bearing portion at the open end of said piston and diametrically opposite segmental bearing portions adjacent to and separated from said head section, and intermediate boss-carrying portions depending from said head and having connections with said segmental bearing portions, said connections being less rigid than said segmental bearing portions and being flexible to permit said boss-carrying portions when said head section expands to apply stresses to said segmental bearing portions in a manner tending to draw said segmental portions toward each other, said boss-carrying portions and connections being formed to have no contact with the engine cylinder, and the portions of said continuous bearing portions underlying said boss-carrying portions being separated from the boss-carrying portions and being yieldable to accommodate the thermal expansion of the piston parts and at the same time to effectively hold the lower end of the piston against lateral movement transversely of the plane of the connecting rod.

10. A piston construction comprising a head section, a boss-carrying part depending from the head section, arcuate cylinder-bearing portions separated from the head section at their upper ends, flexible means connecting the boss-carrying portions with the cylinder-bearing portions, said connecting means being adapted when the head expands to apply stresses to the upper portions of said cylinder-bearing portions in such a manner as to tend to draw said cylinder-bearing portions toward each other without substantial distortion thereof, and cylinder-bearing portions underlying said boss-carrying portions and connected directly therewith, said last named cylinder-bearing portions forming continuations of said first named cylinder-bearing portions, said piston being slit upwardly from its lower end for a portion of its length to render the open end of said piston circumferentially compressible.

In testimony whereof, I hereunto affix my signature.

LOUIS P. MOOERS.